Patented Oct. 12, 1954

2,691,639

UNITED STATES PATENT OFFICE 2,691,639

WATER-DISPERSIBLE MOLDING COMPOSITIONS AND ARTICLES PREPARED THEREFROM

Harold H. Roth, Bay City, Mich., assignor to The Dow Chemical Company, Midland, Mich., a corporation of Delaware No Drawing. Application February 7, 1952,
Serial No. 270,509

12 Claims. (Cl. 260—33.4)

This invention concerns certain new water-dispersible thermoplastic molding compositions comprising synthetic resin sulphonates which are not, of themselves, thermoplastic or moldable. It pertains especially to thermoplastic compositions comprising water-dispersible or water-soluble salts of sulphonated alkenyl aromatic resins.

The alkenyl aromatic resins that are sulfonated, and used in sulfonated form as the resin sulfonate ingredients of the compositions of the invention, are solid thermoplastic polymers or copolymers of one or more alkenyl aromatic compounds having a general formula:

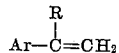

wherein Ar represents a monovalent aromatic radical of the benzene series and R represents hydrogen or a methyl group. Examples of such resins are the solid homopolymers of styrene, ar-chlorostyrene, alpha-methylstyrene, ar-methylstyrene, ar-ethylstyrene, ar-vinylxylene, and ar-methyl-alpha-methylstyrene; solid copolymers of any two or more of such compounds with one another, e. g. copolymers of styrene and alpha-methylstyrene, of styrene and ar-methylstyrene, and of styrene and ar-chlorostyrene; and solid copolymers of one or more of such alkenyl aromatic compounds with a minor amount, e. g. 20 per cent by weight or less, of other polymerizable mono-olefinic compounds such as butenes, pentenes, etc. Benzene-soluble homopolymers and copolymers composed entirely of alkenyl aromatic compounds having the above general formula are usually sulphonated to obtain the resin sulphonate ingredients of the compositions of this invention.

It is known that alkenyl aromatic resins may be sulphonated by reaction with usual sulphonating agents, such as concentrated sulphuric acid, fuming sulphuric acid, chloro-sulphonic acid, and sulphur trioxide or ether-complexes thereof, to obtain alkenyl aromatic resin sulphonic acids which vary from being water-insoluble, to being highly swellable with water, to being soluble or dispersible in water, depending on the extent to which the resins are sulphonated and the conditions under which the reaction is carried out. All of the alkenyl aromatic resin sulphonic acids may be neutralized with alkalies to obtain corresponding salts thereof. The alkenyl aromatic resin sulphonic acids which are highly swellable by, or soluble in, water form ammonium, alkali metal, and in many instances alkaline earth metal, salts which are also swellable by, or soluble in, water.

The alkenyl aromatic resin sulphonates with which this invention is concerned are the salts, of sulphonated alkenyl aromatic resins, which are soluble, or dispersible, in water, or are capable of being swollen to at least 200 times their initial volume upon being contacted with water. Such extensive swelling results in formation of a soft, weak gel which may be broken into bits and dispersed as small fragments, or particles, by stirring the same together with water. The suitable alkenyl aromatic resin sulphonate salts are substantially neutral materials which contain an average of from 0.55 to 0.95 sulphonate radical per aromatic nucleus in the same. These salts are useful as agents for thickening aqueous liquids to increase the viscosity thereof, e. g. with formation of sizing compositions, but they are not thermoplastic and cannot satisfactorily be molded or extruded to obtain articles of desired size and shape.

Examples of such suitable alkenyl aromatic resin sulphonate salts are the ammonium, sodium, potassium, lithium, calcium, barium, strontium, and magnesium salts of sulphonated polystyrene containing an average of from 0.55 to 0.95 sulphonate radicals per aromatic nucleus of the same; corresponding salts of the sulphonated solid homopolymers of ar-methylstyrene having a similar proportion of sulphonate radicals in the sulphonated material; corresponding salts of sulphonated solid copolymers of styrene and ar-methylstyrene, which sulphonated copolymers contain the above-stated proportions of sulphonate radicals; and ammonium, sodium, potassium, and lithium salts of sulphonated solid copolymers of styrene and alpha-methylstyrene, which sulphonated copolymers contain an average of from 0.55 to 0.95 sulphonate radicals per aromatic nucleus. In general, the ammonium, alkali metal and alkaline earth metal salts of any of the aforementioned sulphonated alkenyl aromatic resins can be used in the compositions of the invention, provided the salts are soluble in, or highly swellable by, water and contain sulphonate radicals in proportions within the limits given above.

It has been found that although the suitable alkenyl aromatic resin salts just mentioned are not, of themselves, thermoplastic or moldable, any such salt can be blended together with minor amounts of certain saturated aliphatic polyhydric alcohols to obtain substantially uniform compositions which are thermoplastic and which can be molded or extruded by application of heat and pressure without undergoing decomposition. It has further been found that the solid molded articles thus obtained possess good strength and stability over long periods of time, e. g. a month or longer, under ordinary atmospheric conditions inside a room, but that they may readily and quite rapidly be dissolved, or swollen to form a fragile gel which may be broken up and dispersed as fragments, upon being contacted with water or other aqueous liquids. The volume of water, or other aqueous liquids, required for destruction of the molded articles, varies somewhat for different alkenyl aromatic resin sulphonate ingredients of such articles and depends in part on the degree of destruction desired, but usually is 100 or more times the initial volume of the molded article. Thus, the compositions of the invention may be molded, or extruded, to obtain water-dispersible containers such as packets, capsules, tubes, or to form temporary barriers, plugs, protective coverings, etc., all of which can be dissolved or dispersed in water or other aqueous liquids when destruction of the same is desired. The invention pertains both to the molding compositions which are provided and to molded and extruded articles prepared therefrom.

The saturated aliphatic polyhydric alcohols which are employed in making the thermoplastic compositions of this invention are those with from two to six carbon atoms per molecule and a ratio of from 1.0 to 1.5 carbon atoms per oxygen atom; such polyhydric alcohols are, for example, ethylene glycol, diethylene glycol, triethylene glycol, propylene glycol, glycerine, etc. Such polyhydric alcohols may be used alone or in admixture with each other. The polyhydric alcohols may be of high purity or of technical grades containing minor amounts, e. g. up to 10 per cent by weight, of usual impurities such as monohydric alcohols, esters, or water.

In practice of the invention, a major amount of one or more of the aforementioned water-soluble, or water-swellable, salts of sulphonated alkenyl aromatic resins and a minor amount of one or more of the above-mentioned saturated aliphatic polyhydric alcohols, are admixed to cause absorption, or dissolving, of the polyhydric alcohol in the salt with formation of a substantially uniform solid composition. Any mode or order of mixing the ingredients may be employed. For instance, the ingredients may be admixed and permitted to stand at room temperatue until the polyhydric alcohol is absorbed by the salt. Usually, the ingredients are mixed at room temperature or above, and the mixture is stirred and heated to form a plastic mass which may be shaped into molding granules, or be cooled to harden the same and comminuted. Alternatively, the polyhydric alcohol may be added to an aqueous dispersion or solution of the alkenyl aromatic resin sulphonate and the water may be evaporated to obtain the molding composition as the residue.

The compositions vary from fairly soft, flexible bodies to hard, rigid bodies with changes in the kinds and relative proportions of the alkenyl aromatic resin sulphonate and the polyhydric alcohol employed in making the same. It has been found that employment of from 5 to 50 parts by weight of polyhydric alcohol per 100 parts of the salt of a sulphonated alkenyl aromatic resin results in compositions which are solid at room temperature, but readily moldable under the action of heat and pressure. Compositions containing larger proportions of the alcohol, relative to the resin sulphonate, are often too soft at room temperature for most purposes and may even be liquid. Compositions which contain less than 5 parts of polyhydric alcohol per 100 parts of the resin sulphonate usually are difficult to mold and produce moldings which are brittle and easily shattered. For most purposes, there are employed from 10 to 35, preferably from 15 to 30 parts of polyhydric alcohol per 100 parts of the salt of a sulphonated alkenyl aromatic resin in preparing the compositions. These compositions may readily be molded or extruded to obtain articles which are of satisfactory hardness, flexibility, and strength.

The compositions of the invention may be compression molded, injection molded, or extruded by procedures similar to those employed with other thermoplastic resins. In most instances, the compositions have been molded at a temperature of 150° C. under pressures of from 300 to 500 pounds per square inch, but lower or higher molding temperatures and pressures can be used. The optimum molding conditions vary somewhat for different compositions within the scope of the invention, but are readily determined in usual ways for any such composition.

The following examples illustrate ways in which the invention has been practiced, but are not to be construed as limiting its scope.

EXAMPLE 1

A molding grade polystyrene, having a viscosity characteristic of 36 centipoises as determined for a 10 per cent by weight solution of the same in toluene at a temperature of 25° C., was sulphonated in solution in carbon tetrachloride by reaction with sulfur trioxide. The polystyrenesulfonic acid was neutralized with sodium hydroxide and the sodium salt of the polystyrenesulfonic acid collected. The neutral sodium salt of the sulfonated polystyrene so produced was a granular, non-thermoplastic solid which contained about 15 per cent by weight of sodium sulfate and about 10 per cent of water. It was dispersible in water to form a clear, and presumably colloidal, solution thereof. Separate portions of this neutral sodium salt of sulfonated polystyrene were mixed with various amounts of several polyhydric alcohols by grinding the salt and the polyhydric alcohol together in a mortar. The polyhydric alcohols appeared to be absorbed by the salt. Compositions containing small proportions of polyhydric alcohols were free-flowing, granular solids, while those containing large proportions of polyhydric alcohols were more dough-like. These compositions were molded in a flat platen press at a temperature of about 150° C. and an applied pressure of about 400 pounds per square inch. Test pieces were cut from the molded sheets and were used in determining the tensile strength in pounds per square inch of initial cross section and the per cent elongation value, i. e. the per cent of its original length by which a test piece could be stretched before breakage, in accordance with usual test procedures. Table I names the polyhydric alcohol in each composition and gives the proportion of the same expressed in parts by weight per 100 parts of the sodium salt of sulphonated polystyrene present in the composition. The table gives the thickness in inches and the tensile strength and per cent elongation values for each molded test piece.

The molded sheets varied from being translucent to transparent and from being colorless to being of amber color. Each sheet was of substantially uniform appearance throughout the length and breadth of the same. Moldings of good appearance were also made from compositions containing 10 parts by weight of each of the polyhydric alcohols of Table I per 100 parts by weight of the sodium salt of the sulfonated polystyrene, but these moldings were too brittle to permit cutting of test pieces for determination of tensile strength and per cent elongation values.

*Table I*

| Experiment No. | Polyhydric Alcohol | | Properties of Molded Sheets | | |
|---|---|---|---|---|---|
| | Kind | Amount pts./100 pts. of salt | Thickness, inches | Tensile Strength, lbs./sq. in. | Percent Elongation |
| 1 | Ethylene glycol | 20 | 0.027 | 1,090 | 11.2 |
| 2 | do | 33 | 0.021 | 630 | 28.3 |
| 3 | Propylene glycol | 20 | 0.0284 | 1,160 | 9.3 |
| 4 | do | 33 | 0.0199 | 1,730 | 13.0 |
| 5 | Diethylene glycol | 20 | 0.0351 | 320 | 36.0 |
| 6 | Glycerine | 20 | 0.0125 | 2,270 | 3.9 |
| 7 | do | 33 | 0.0125 | 1,330 | 35.0 |

EXAMPLE 2

A molding grade of polymeric ar-methylstyrene, having a viscosity characteristic of 28 centipoises, as determined at 25° C. for a ten per cent by weight solution of the product in toluene, was sulphonated with chlorosulfonic acid and converted with ammonia to an ammonium salt of the sulphonated polymeric ar-methylstyrene. The salt was a non-thermoplastic granular solid which was dispersible in water. One hundred parts by weight of this ammonium salt was mixed in a mortar with 33 parts by weight of propylene glycol. The mixture was molded in a flat platen press at a temperature of about 150° C. and an applied pressure of about 400 pounds per square inch. A clear, flexible sheet resulted, having a tensile strength of 1840 pounds per square inch.

EXAMPLE 3

Two samples of polystyrene, one of which had an average molecular weight of approximately 50,000 and the other an average molecular weight of approximately 200,000 (as determined by the well known Staudinger viscosity method), were sulfonated and converted to the sodium salts. Each salt was compounded with propylene glycol to the extent of about 33 parts by weight of propylene glycol per 100 parts by weight of the sodium salt. Each composition thus formed was molded at a temperature of about 150° C. and under an applied pressure of about 400 pounds per square inch in a flat platen press to a thin, flexible sheet. Test pieces cut from the sheets were used to determine the tensile strength in pounds per square inch of cross section and the per cent elongation value of each molded composition. Table II identifies each composition by giving the average molecular weight of the polystyrene used in making the sulphonate ingredient thereof and gives the tensile strength and per cent elongation values of the molded composition.

*Table II*

| Experiment No. | Molecular Weight of Polystyrene | Properties of Moldings | |
|---|---|---|---|
| | | Tensile Strength, lbs./sq. in. | Percent Elongation |
| 1 | 50,000 | 420 | 2.8 |
| 2 | 200,000 | 1,730 | 13.0 |

EXAMPLE 4

Polystyrene, having an average molecular weight of about 50,000 as determined by the Staudinger viscosity method, was sulphonated and converted to the sodium salt. A mixture of 100 parts by weight of this sodium salt and 33 parts by weight of propylene glycol was molded at a temperature of about 150° C. and a pressure of about 400 pounds per square inch in a flat platen press to a sheet 0.0085 inch thick. Two rectangular pieces of this sheet, each 2 inches by 3 inches, were placed together in an aligned, piled arrangement and a narrow margin of three edges of the pair of sheets was heat sealed at a temperature of about 110° C. to form an envelope-like container. Into this envelope was placed one gram of soap powder. The open fourth edge of the envelope was closed and heat sealed in the same manner as were the other edges. The closed packet was stored under ordinary room conditions for about a week with no apparent change in its properties. The packet was then dropped into water at a temperature of 47° C. with agitation. Suds began to form in 18 seconds and the envelope of the packet was completely dissolved in 50 seconds. In a comparable test, one gram of loose soap powder, identical with that contained in the packet, was dropped into water at 47° C. with agitation; ten seconds were required to form suds.

I claim:

1. A solid, thermoplastic composition comprising 100 parts by weight of at least one substantially neutral salt of a sulphonated thermoplastic resin, which resin is a polymer of an alkenyl aromatic compound having the general formula:

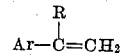

$$Ar-\overset{R}{\underset{|}{C}}=CH_2$$

wherein Ar represents a monovalent aromatic radical of the benzene series and R represents a member of the group consisting of hydrogen and the methyl radical, which salt of a sulfonated polymer contains an average of from 0.55 to 0.95 sulfonate radical per aromatic nucleus and is swellable to soluble in water, and from about 5 to about 50 parts of at least one liquid polyhydric alcohol containing from 2 to 6 carbon atoms and having a ratio of from 1 to 1.5 carbon atoms per atom of oxygen in the molecule.

2. A composition, as described in claim 1, wherein the salt of the sulphonated polymer is swellable to at least 200 times its initial volume by the action of water.

3. A composition, as described in claim 1, wherein the salt of the sulphonated polymer is soluble in water.

4. A composition, as described in claim 3, comprising from 15 to 30 parts by weight of the polyhydric alcohol per 100 parts of the salt of the sulphonated polymer.

5. A composition, as described in claim 3, wherein the salt of the sulphonated polymer is a sodium salt of sulphonated polystyrene.

6. A composition, as described in claim 3, wherein the salt of the sulphonated polymer is a sodium salt of a sulphonated polymer of ar-methylstyrene.

7. A composition, as described in claim 3, wherein the polyhydric alcohol is ethylene glycol.

8. A composition, as described in claim 3, wherein the polyhydric alcohol is propylene glycol.

9. A composition, as described in claim 3, wherein the polyhydric alcohol is glycerine.

10. A method which comprises admixing from 5 to 50 parts by weight of a saturated aliphatic polyhydric alcohol, containing from 2 to 6 carbon atoms and having a ratio of from 1 to 1.5 carbon atoms per atom of oxygen in the molecule, with 100 parts of a salt of a sulphonated thermoplastic resin, which resin is a polymer of an alkenyl aromatic compound having the general formula:

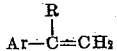

wherein Ar represents a monovalent aromatic radical of the benzene series and R is a member of the group consisting of hydrogen and the methyl radical, which salt of a sulfonated polymer contains an average of from 0.55 to 0.95 sulfonate radical per aromatic nucleus and is swellable to soluble in water, to form a solid thermoplastic composition consisting essentially of said salt having the polyhydric alcohol absorbed therein, and shaping the composition under the action of heat and pressure.

11. A solid composition comprising 100 parts of the ammonium salt of sulfonated polystyrene and 5–50 parts of glycerin.

12. A solid composition comprising 100 parts by weight of a water-soluble salt of sulfonated polystyrene and from 5 to 50 parts of glycerine.

References Cited in the file of this patent

UNITED STATES PATENTS

| Number | Name | Date |
| --- | --- | --- |
| 2,533,210 | Baer | Dec. 12, 1950 |
| 2,533,211 | Baer | Dec. 12, 1950 |